(12) United States Patent
Zhang et al.

(10) Patent No.: US 8,953,461 B2
(45) Date of Patent: Feb. 10, 2015

(54) METHOD, DEVICE, AND SYSTEM FOR PROCESSING BORDER GATEWAY PROTOCOL ROUTE

(75) Inventors: Lixin Zhang, Beijing (CN); Shuanglong Chen, Beijing (CN); Yuan Rao, Beijing (CN); Lei Fan, Beijing (CN); Boyan Tu, Beijing (CN); Jianwen Liu, Beijing (CN); Jianbin Xu, Beijing (CN); Qing Zeng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 493 days.

(21) Appl. No.: 13/163,133

(22) Filed: Jun. 17, 2011

(65) Prior Publication Data

US 2011/0242991 A1  Oct. 6, 2011

Related U.S. Application Data

(63) Continuation of application No. PCT/CN2009/075670, filed on Dec. 17, 2009.

(30) Foreign Application Priority Data

Dec. 19, 2008 (CN) .......................... 2008 1 0240442
Mar. 30, 2009 (CN) .......................... 2009 1 0081235

(51) Int. Cl.
*H04L 12/26* (2006.01)
*H04L 12/56* (2006.01)
(Continued)

(52) U.S. Cl.
CPC ................ *H04L 45/04* (2013.01); *H04L 45/02* (2013.01)
USPC ....... 370/242; 370/216; 370/232; 370/395.53

(58) Field of Classification Search
USPC .................................................. 370/216, 232
See application file for complete search history.

(56) References Cited

U.S. PATENT DOCUMENTS 7,027,396 B1 *   4/2006  Golan et al. ................... 370/232
2005/0111445 A1 * 5/2005  Wybenga et al. ............. 370/389

(Continued)

FOREIGN PATENT DOCUMENTS

CN       1523850 A      8/2004
CN       1567866 A      1/2005

(Continued)

OTHER PUBLICATIONS

Written Opinion of the International Searching Authority relating to International Application No. PCT/CN2009/075670; filed Dec. 17, 2009; mailed Mar. 18, 2010 (4 pgs.).

(Continued)

*Primary Examiner* — Kiet Tang
(74) *Attorney, Agent, or Firm* — Slater & Matsil, L.L.P.

(57) ABSTRACT

A method, device, and system for processing Border Gateway Protocol (BGP) route are provided, which relate to the field of network communication technologies. The method includes: receiving a BGP route sent by a BGP neighbor; obtaining a route prefix of the BGP route according to the BGP route; determining, according to the route prefix, a BGP route storing and processing module corresponding to the route prefix; and sending the BGP route to the determined BGP route storing and processing module, so that the BGP route storing and processing module processes the received BGP route. A device and a system for processing BGP route are also provided. Therefore, the processing efficiency of the BGP route is improved, and the high extensibility is realized.

23 Claims, 5 Drawing Sheets

(51) Int. Cl.
*H04L 12/28* (2006.01)
*H04L 12/715* (2013.01)
*H04L 12/751* (2013.01)

(56) References Cited

U.S. PATENT DOCUMENTS

2006/0268681 A1* 11/2006 Raza .......................... 370/216
2007/0258376 A1    11/2007 Li
2008/0198859 A1     8/2008 Elias et al.

FOREIGN PATENT DOCUMENTS

| CN | 1976313 A    | 6/2007  |
| CN | 101014014 A  | 8/2007  |
| CN | 101304379 A  | 11/2008 |
| CN | 101753430 B  | 7/2012  |
| WO | 2004114634 A1 | 12/2004 |
| WO | WO 2004/114634 A1 | 12/2004 |
| WO | WO 2010/069261 A1 | 6/2010 |

OTHER PUBLICATIONS

First Chinese Office Action (partial translation) relating to Chinese Application No. 200810240442.8; mailed Sep. 15, 2011 (4 pgs.).

International Search Report from the Chinese Patent Office in International Application No. PCT/CN2009/075670 mailed Mar. 18, 2010.

Second Chinese Office Action with Partial English Translation received in Chinese Patent Application No. 200910081235.7, mailed Oct. 10, 2012, 10 pages.

Third Chinese Office Action with Partial English Translation received in Chinese Patent Application No. 200910081235.7, mailed May 9, 2013, 15 pages.

* cited by examiner

US 8,953,461 B2

METHOD, DEVICE, AND SYSTEM FOR PROCESSING BORDER GATEWAY PROTOCOL ROUTE

CROSS-REFERENCE TO RELATED APPLICATIONS

This application is a continuation of International Application No. PCT/CN2009/075670, filed on Dec. 17, 2009, which claims priority to Chinese Patent Application No. 200810240442.8, filed on Dec. 19, 2008 and Chinese Patent Application No. 200910081235.7, filed on Mar. 30, 2009, all of which are hereby incorporated by reference in their entireties.

FIELD OF THE INVENTION

The present invention relates to the field of network communications technologies, and in particular, to a technology for processing a Border Gateway Protocol (BGP) route.

BACKGROUND OF THE INVENTION

With the continuous development of IP technologies, the number of global Internet users continuously grows globally, and at the same time, the number of Internet routes is ever increasing. Presently, the transmission of the Internet routes is mainly completed through a Border Gateway Protocol (BGP) route, which brings about a new challenge to the BGP protocol. With the increase of BGP neighbors and BGP routes, the burden of the board where BGP route processing units responsible for processing the BGP routes locate gets increasingly heavier.

In a centralized BGP route processing framework, as shown in FIG. 1, a single BGP route processing unit processes route information sent by BGP neighbors Peer1, Peer2, and Peer3, and at this time, the board where the BGP route processing unit locates becomes a performance bottleneck. Although the problem can be alleviated through optimizing the route algorithm, optimizing the data structure relevant to the BGP route, and reducing the memory occupancy of the BGP and improving the hardware of the board where the BGP route processing unit locates, it is still difficult to support the capacity of large quantities of BGP routes and large quantities of BGP neighbors that are increasing gradually. The BGP neighbor refers to peer equipment that establishes a BGP adjacency relation with local equipment, and not only includes equipment directly connected to the local equipment, but also includes peer equipment connected to the local equipment over multiple physical equipment.

In a peer-distributed BGP (PD-BGP) processing framework, as shown in FIG. 2, the BGP is designed in a distributed manner, and neighbors are distributed in different BGP route processing units, so that each BGP route processing unit only processes BGP neighbors related to the BGP route processing unit itself, and some centralized processing is distributed. A PD-BGP route processing unit completes the receiving and sending of BGP routes, performs partial routing, and sends locally preferred BGP routes to a center BGP (C-BGP) route processing unit, so that the C-BGP route processing unit only stores information of BGP routes that may be preferred. As the centralized processing point of BGP routes, the C-BGP route processing unit processes BGP routes of all route prefixes, and at this time, the board where the C-BGP route processing unit locates is still the bottleneck of the performance of the system.

SUMMARY OF THE INVENTION

Embodiments of the present invention provide a method, device, and system for processing a BGP route, which can improve the processing efficiency and storage capacity of the BGP route, so as to enable high extensibility. The technical solutions are as follows.

An embodiment of the present invention provides a method for processing a BGP route, where the method includes:
 receiving a BGP route sent by a BGP neighbor;
 obtaining a route prefix of the BGP route according to the BGP route;
 determining, according to the route prefix, a BGP route storing and processing module corresponding to the route prefix; and
 sending the BGP route to the determined BGP route storing and processing module, so as to enable the BGP route storing and processing module to process the received BGP route.

An embodiment of the present invention provides a system for processing a BGP route, where the system includes a BGP route storing and processing module, the number of the BGP route storing and processing module is at least two;
 the system further includes: a neighbor route receiving and distributing module, configured to receive a BGP route sent by a BGP neighbor, obtain a route prefix of the BGP route, determine, according to the route prefix, a BGP route storing and processing module corresponding to the route prefix, and send the BGP route to the determined BGP route storing and processing module; and
 the BGP route storing and processing module is configured to process the received BGP route.

An embodiment of the present invention provides a device for processing a BGP route, where the device includes:
 a receiving module, configured to receive a BGP route sent by a BGP neighbor;
 an obtaining module, configured to obtain a route prefix of the BGP route;
 a determining module, configured to determine, according to the route prefix, a BGP route storing and processing module corresponding to the route prefix; and
 a sending module, configured to send the BGP route to the determined BGP route storing and processing module, so as to enable the BGP route storing and processing module to process the received BGP route.

In the embodiments of the present invention, with the route prefix as granularity, the BGP route storing and processing module corresponding to the route prefix is determined according to the route prefix, and the BGP routes may be distributed to different BGP route storing and processing modules for processing, so as to improve processing efficiency and storage capability of the BGP routes and realize high extensibility.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

In order to make the objectives, technical solutions, and advantages of the present invention more comprehensible, the embodiments of the present invention will be further described in detail below with reference to the accompanying drawing. Apparently, the embodiments described below are for the exemplary purpose only, without covering all embodiments of the present invention. Persons of ordinary skill in the art can derive other embodiments based on the embodiments of the present invention without creative efforts, which all fall within the protection scope of the present invention.

Embodiment 1

Figure 1:
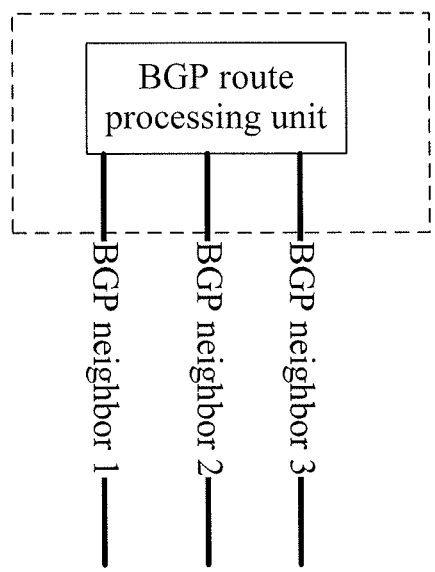
FIG. 1 is a schematic structural view of a centralized system for processing a BGP route in the prior art.
Figure 2:
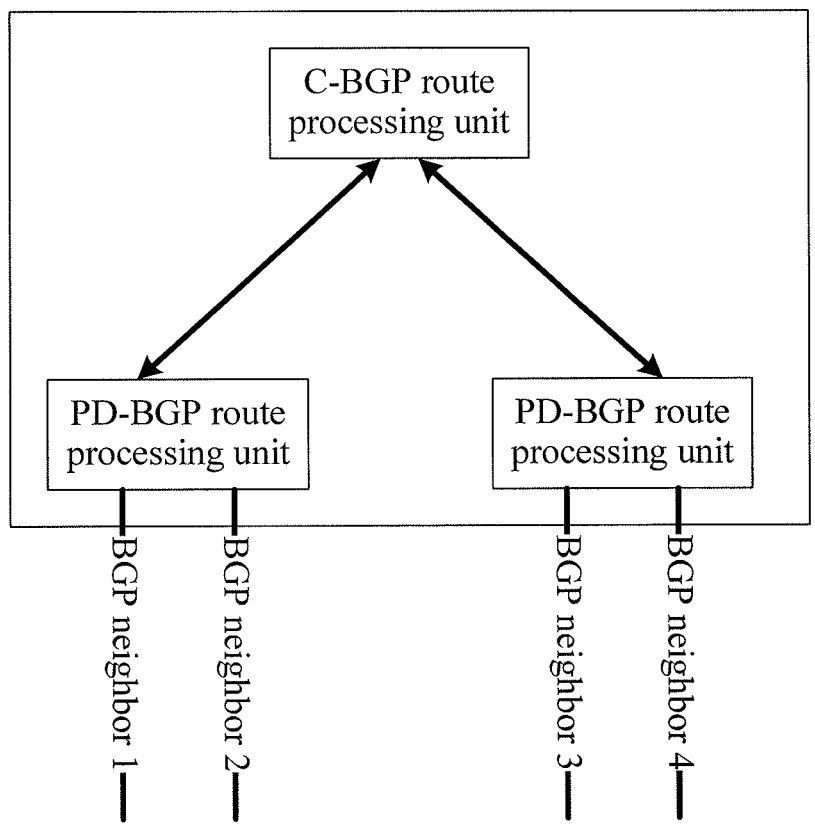
FIG. 2 is a schematic structural view of a peer-distributed device for processing a BGP route in the prior art.
Figure 3:
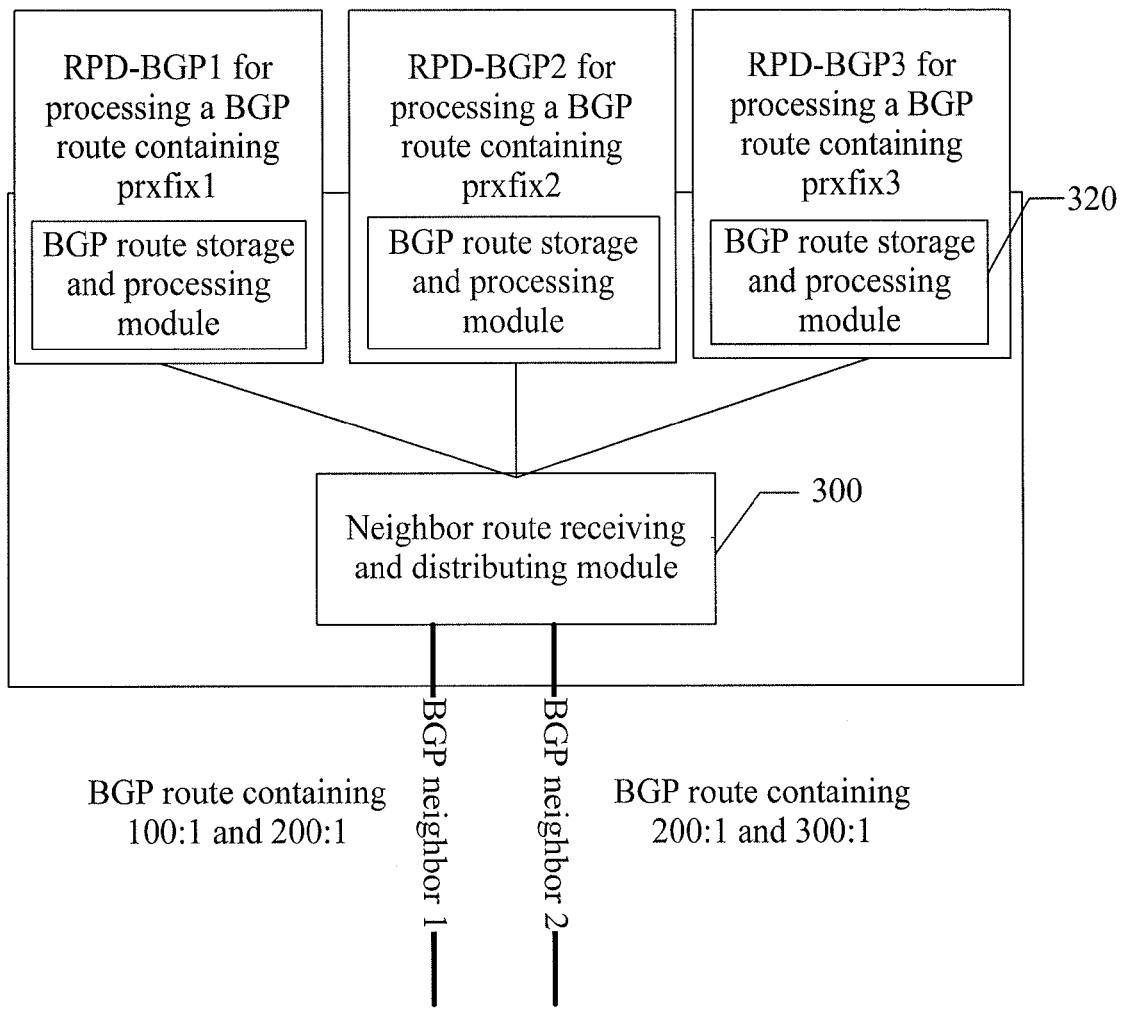
FIG. 3 is a schematic structural view of a system for processing a BGP route according to a first embodiment of the present invention.

A system for processing BGP route is provided, as shown in FIG. 3.

A device for processing, based on route prefix, a BGP route in FIG. 3 includes: a neighbor route receiving and distributing module 300 and at least two BGP route storing and processing modules 320. One BGP route storing and processing module 320 may be deployed to a route-prefix-distributed (RPD)-based BGP operating unit, where the RPD-based BGP operating unit may be referred to as a RPD-BGP operating unit, and the RPD-BGP operating unit may be implemented in a process or thread mode.

It should be noted that, although three BGP route storing and processing modules 320 are shown in FIG. 3, in other embodiments, the number of the BGP route storing and processing modules 320 may be greater than three, and may also be two. Furthermore, the number of the neighbor route receiving and distributing module 300 may be one or more.

The neighbor route receiving and distributing module 300 receives a BGP route from a BGP neighbor (for example, provider edge (PE) equipment or customer edge (CE) equipment). The neighbor route receiving and distributing module 300 in FIG. 3 is capable of receiving BGP routes sent by a BGP neighbor 1 and a BGP neighbor 2, where the BGP routes sent by the BGP neighbor 1 include a BGP route with a route prefix of 100:1 and a BGP route with a route prefix of 200:1; and the BGP routes sent by the BGP neighbor 2 include a BGP route with a route prefix of 300:1 and a BGP route with a route prefix of 200:1. The BGP routes received by the neighbor route receiving and distributing module 300 may be BGP routes obtained from a received Update message. The route prefixes of 100:1, 200:1, and 300:1 in FIG. 3 are route distinguishers (RDs) in the route prefixes of virtual private network (VPN) routes, that is to say, the BGP routes in FIG. 3 are VPN routes. If the BGP routes are not VPN routes, the route prefix of 100:1 in FIG. 3 may be replaced by 10.1/16, the route prefix of 200:1 in FIG. 3 may be replaced by 20.1/16, and the route prefix of 300:1 in FIG. 3 may be replaced by 30.1/16.

The neighbor route receiving and distributing module 300 is capable of determining, according to locally stored information about the route prefixes and about BGP route storing and processing modules 320, the BGP route storing and processing module 320 corresponding to the route prefix of the BGP route, and sending the BGP route, which is from the BGP neighbor, to the determined BGP route storing and processing module 320.

The BGP route storing and processing module 320 receives the BGP route sent by the neighbor route receiving and distributing module 300, and processes the received BGP route.

When Embodiment 1 is applied in a VPN environment, the BGP route may specifically be a VPN route, and the route prefix may specifically be an RD in a route prefix of the VPN route. The VPN route may be a VPN route sent by a PE neighbor and a VPN route converted from a private network route sent by a CE neighbor.

If the neighbor route receiving and distributing module 300 receives the private network route sent by the CE neighbor, the neighbor route receiving and distributing module 300 needs to convert the private network route into a VPN route. An example about that the neighbor route receiving and distributing module 300 converts the private network route into a VPN route is as follows. The neighbor route receiving and distributing module 300 determines a virtual route forward (VRF) corresponding to the private network route. The neighbor route receiving and distributing module 300 converts the private network route into a VPN route by using an RD of the VRF. Then, the neighbor route receiving and distributing module 300 obtains an RD of the converted VPN route.

In this embodiment, as different BGP route storing and processing modules 320 (RPD-BGP operating units) may be distributed at different boards, each board (that is, each BGP route storing and processing module 320, or each RPD-BGP operating unit) may not need to process all the BGP routes received by the device, but only process part of the BGP routes received by the device, thereby reducing the burden of the board, avoiding the bottleneck problem of BGP processing performance, and improving the extensibility of the network.

Embodiment 2

Figure 4:
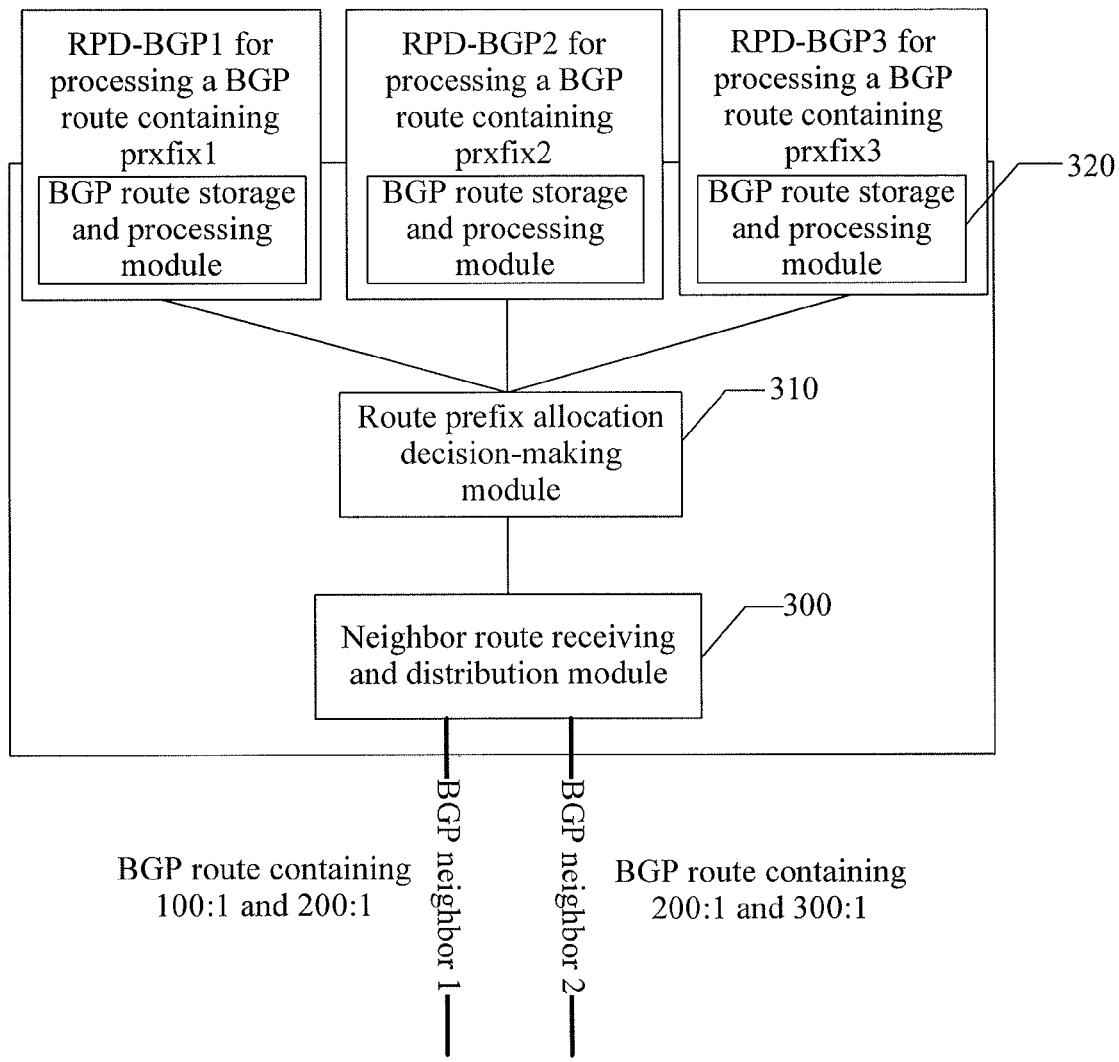
FIG. 4 is a schematic structural view of a system for processing a BGP route according to a second embodiment of the present invention.

Different from Embodiment 1, a system for processing BGP route provided in this embodiment has a route prefix allocation decision-making module 310 newly added, as shown in FIG. 4.

In FIG. 4, after receiving a BGP route sent by a BGP neighbor, the neighbor route receiving and distributing module 300 obtains a route prefix of the BGP route, and after failing to determine, according to locally stored information, a BGP route storing and processing module 320 corresponding to the route prefix of the BGP route, the neighbor route receiving and distributing module 300 sends a query request carrying the route prefix to the route prefix allocation decision-making module 310. Or, after receiving a BGP route sent by a BGP neighbor, the neighbor route receiving and distributing module 300 obtains a route prefix of the BGP route, and directly sends a query request carrying the route prefix to the route prefix allocation decision-making module 310. The locally stored information is corresponding relation information of route prefixes and the BGP route storing and processing module 320.

After receiving the query request, the route prefix allocation decision-making module 310 determines, according to the query request, the BGP route storing and processing module 320 corresponding to the route prefix, and returns a query result to the neighbor route receiving and distributing module 300, that is, notifies the neighbor route receiving and distributing module 300 of information of the BGP route storing and processing module 320 corresponding to the route prefix.

A first example about that the route prefix allocation decision-making module 310 determines the BGP route storing and processing module 320 is as follows. The route prefix allocation decision-making module 310 searches a corresponding relation matching the route prefix carried in the query request in the corresponding locally stored relation information about the locally stored route prefixes and about the BGP route storing and processing modules 320, and the BGP route storing and processing module 320 in the matched corresponding relation is the BGP route storing and processing module 320 to be selected. Herein, the corresponding relation should cover all the route prefixes as possible, and should be a one-to-one corresponding relation as possible, that is, one route prefix only corresponds to information of one BGP route storing and processing module 320, and multiple route prefixes may correspond to the information of the same BGP route storing and processing module 320. If multiple BGP route storing and processing modules 320 are matched, one BGP route storing and processing module 320 may be determined among the multiple matched BGP route storing and processing modules 320 by using a certain algorithm or a method of load balancing, that is, the finally determined BGP route storing and processing module 320 is only one. If the matching fails, the route prefix allocation decision-making module 310 may return information of failed matching to a requesting party, and the requesting party receives the information of failed matching, and performs subsequent BGP route sending processing by using the processing method of sending the BGP route according to the default BGP route storing and processing module 320.

The corresponding relation information locally stored in the route prefix allocation decision-making module 310 may be statically configured through commands, and an example of a command for statically configuring the corresponding relation is:

bgp
rpd-distributed-limit n
prefix distributed n.

An example of statically configuring the corresponding relation through the above command is:

bgp
rpd-distributed-limit 4
prefix 10.1/16 distributed 0
prefix 20.1/16 distributed 2
prefix 30.1/16 distributed 2.

After executing the command, a corresponding relation of the prefix 10.1/16 and a BGP route storing and processing module 0, a corresponding relation of the prefix 20.1/16 and a BGP route storing and processing module 2, and a corresponding relation of the prefix 30.1/16 and the BGP route storing and processing module 2 are established.

In the VPN environment, an example of a command for statically configuring the corresponding relation is:

bgp
rd-distributed-limit n
rd x:x distributed n.

An example of statically configuring the corresponding relation through the above command is:

bgp
rd-distributed-limit 4
rd 1:1 2:2 distributed 0
rd 1.2.3.4:100 distributed 2
rd 10:10 distributed 2.

After executing the above commands, a corresponding relation of RDs of 1:1 and 2:2 and a VPN route storing and processing module 0, a corresponding relation of a RD of 1.2.3.4:100 and a VPN route storing and processing module 2, and a corresponding relation of a RD of 10:10 and a VPN route storing and processing module 2 are established.

A second example about that the route prefix allocation decision-making module 310 selects the BGP route storing and processing module 320 is as follows: the route prefix allocation decision-making module 310 allocates a BGP route storing and processing module 320 for route prefix carried in the query request by using a locally stored route prefix allocation strategy. The route prefix allocation strategy is, for example, sequential allocation in turn, load balancing allocation, or random allocation.

After receiving the query result returned by the route prefix allocation decision-making module 310, the neighbor route receiving and distributing module 300 sends the BGP route to the BGP route storing and processing module 320 determined by the route prefix allocation decision-making module 310.

The BGP route storing and processing module 320 receives the BGP route sent by the neighbor route receiving and distributing module 300, and processes the received BGP route.

The BGP route in Embodiment 2 may be a VPN route, and to be more specific, the route prefix described in Embodiment 2 is an RD in the route prefix of the VPN route. The VPN routes in Embodiment 2 may be a VPN route sent by a PE neighbor and a VPN route converted from a private network route sent by a CE neighbor.

In this embodiment, different BGP route storing and processing modules 320 (RPD-BGP operating units) may be distributed on different boards, each board (that is, each BGP route storing and processing module 320, or each RPD-BGP operating unit) may not need to process all the BGP routes received by the device, but only process part of the BGP routes received by the device, thereby reducing the burden of the board, avoiding the bottleneck problem of BGP processing performance, and improving the extensibility of the network.

Embodiment 3

Figure 5:
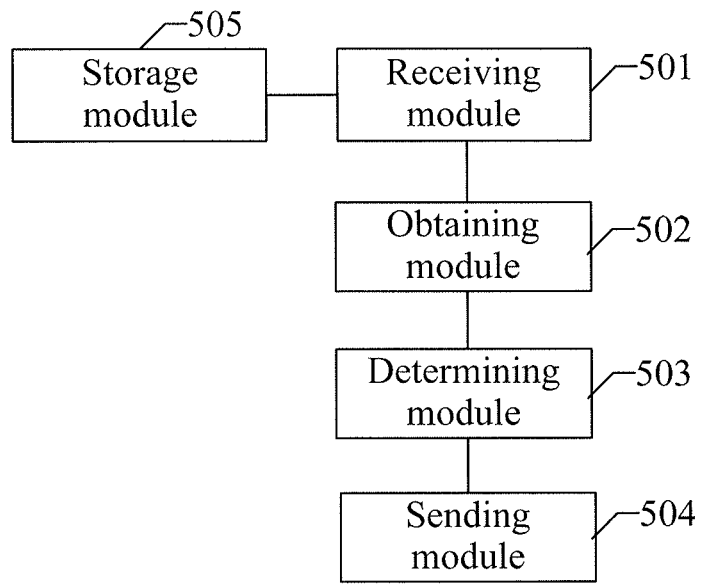
FIG. 5 is a schematic structural view of a device for processing a BGP route according to a third embodiment of the present invention.

An embodiment of the present invention provides a device for processing a BGP route, as shown in FIG. 5, where the device includes:

a receiving module 501, configured to receive a BGP route sent by a BGP neighbor;

an obtaining module 502, configured to obtain a route prefix of the BGP route;

a determining module 503, configured to determine, according to the route prefix, a BGP route storing and processing module corresponding to the route prefix; and a sending module 504, configured to send the BGP route to the determined BGP route storing and processing module, so that the BGP route storing and processing module processes the received BGP route.

Furthermore, the sending module 504 is further configured to send a query request carrying the route prefix to a route prefix allocation decision-making module, when the determining module 503 fails to locally determine the BGP route storing and processing module corresponding to the route prefix; and the receiving module 501 is further configured to receive information of the BGP route storing and processing module corresponding to the route prefix determined according to the route prefix in the query request returned by the route prefix allocation decision-making module.

Furthermore, the sending module 504 is further configured to send a query request carrying the route prefix to the route prefix allocation decision-making module, when the obtaining module 502 obtains the route prefix; and the receiving module 501 is further configured to receive information of the BGP route storing and processing module corresponding to the route prefix returned by the route prefix allocation decision-making module.

Furthermore, the device further includes:

a storage module 505, configured to store the information of the BGP route storing and processing module corresponding to the route prefix returned by the route prefix allocation decision-making module and received by the receiving module 501.

When Embodiment 3 is applied in a VPN environment, the BGP route may be a VPN route. The receiving module 501 may receive a VPN route sent by a PE neighbor, and may also receive a private network route sent by a CE neighbor and further convert the received private network route into a VPN route. An example about that the receiving module 501 converts the private network route into a VPN route is as follows. The receiving module 501 determines a VRF corresponding to the private network route, and converts the private network route into a VPN route by using a RD of the VRF. Thereafter, the route prefix obtained by the obtaining module 502 is an RD of the VPN route.

It can be known from Embodiment 3 that, one BGP route storing and processing module is selected for the BGP route from a BGP neighbor according to the route prefix, so that each BGP route storing and processing module may not need to process all the BGP routes, thereby reducing the burden of BGP route processing of the BGP route storing and processing module, and avoiding the bottleneck problem of the BGP processing performance. Therefore, the BGP route storing and processing module can process more BGP routes, and thereby finally improving the extensibility of the network.

Embodiment 4

Figure 6:
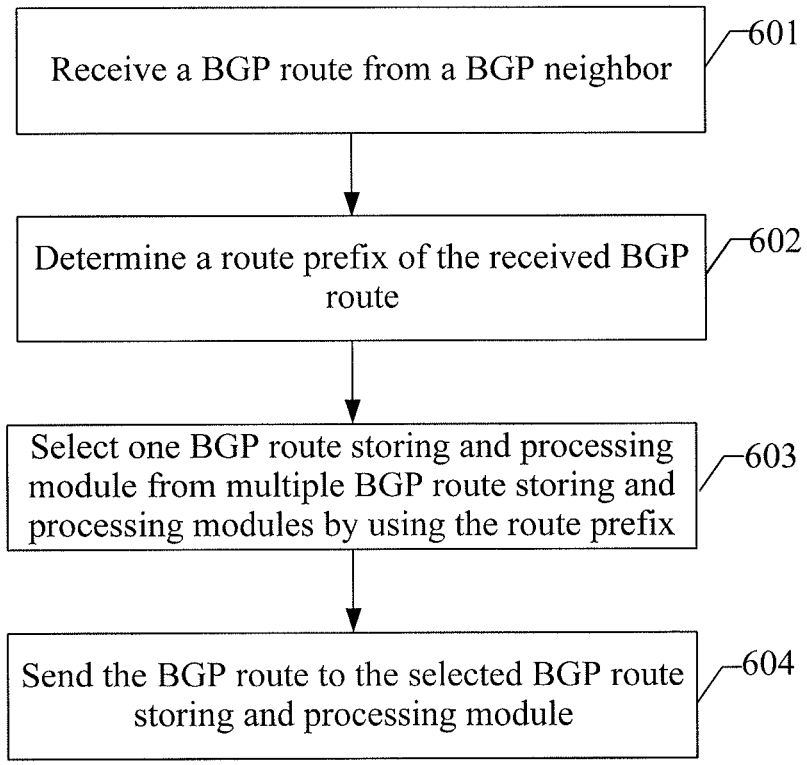
FIG. 6 is a flow chart of a method for processing a BGP route according to a fourth embodiment of the present invention.

A method for processing BGP route is provided, and a flow chart of the method is as shown in FIG. 6.

In FIG. 6, in step 601, a BGP route is received. For example, an Update message is received, and a BGP route is obtained from the Update message. The operation of receiving the BGP route may be performed by a neighbor route receiving and distributing module. In a VPN environment, the BGP route may be a VPN route. The neighbor route receiving and distributing module may receive a VPN route sent by a PE neighbor, and may also receive a private network route sent by a CE neighbor. The neighbor route receiving and distributing module may convert the received private network route into a VPN route.

In step 602, a route prefix of the received BGP route is determined. The operation of determining the route prefix of the BGP route may be performed by the neighbor route receiving and distributing module. If the BGP route is a VPN route, the route prefix described in Embodiment 4 may be an RD in a route prefix of the VPN route.

In step 603, one BGP route storing and processing module is selected for the BGP route from at least two BGP route storing and processing modules by using the determined route prefix.

According to different application scenarios, the operation of selecting the BGP route storing and processing module may be performed by the neighbor route receiving and distributing module, or by a route prefix allocation decision-making module, or by the neighbor route receiving and distributing module and the route prefix allocation decision-making module.

An example of the operation of selecting the BGP route storing and processing module by the neighbor route receiving and distributing module is as follows. The neighbor route receiving and distributing module searches a BGP route storing and processing module corresponding to the route prefix of the BGP route received from the BGP neighbor in the locally stored corresponding relation of the route prefixes and the BGP route storing and processing modules, and the found BGP route storing and processing module is taken as the determined BGP route storing and processing module.

An example of the operation of selecting the BGP route storing and processing module by the route prefix allocation decision-making module is as follows. After receiving the BGP route from the BGP neighbor, the neighbor route receiving and distributing module does not search in the locally stored information, but directly sends a query request carrying the route prefix to the route prefix allocation decision-making module. After receiving the query request, the route prefix allocation decision-making module obtains the route prefix from the query request, determines a BGP route storing and processing module for the obtained route prefix according to the stored corresponding relation and/or a route prefix allocation strategy, and returns a query result to the neighbor route receiving and distributing module, that is, notifies the neighbor route receiving and distributing module of the information of the BGP route storing and processing module corresponding to the route prefix.

An example of the operation of selecting the BGP route storing and processing module by the neighbor route receiving and distributing module and the route prefix allocation decision-making module is as follows. The neighbor route receiving and distributing module searches a corresponding relation matching the route prefix of the BGP route received from the BGP neighbor in the locally stored corresponding relation of the route prefixes and the BGP route storing and processing modules, and if the search result is no matched corresponding relation is found, the neighbor route receiving and distributing module sends a query request carrying the route prefix to the route prefix allocation decision-making module. After receiving the query request, the route prefix allocation decision-making module obtains the route prefix in the query request, determines a BGP route storing and processing module for the obtained route prefix according to the stored corresponding relation and/or a route prefix allocation strategy, and returns a query result to the neighbor route receiving and distributing module, that is, notifies the neighbor route receiving and distributing module of the information of the BGP route storing and processing module corresponding to the route prefix.

In step 604, the received BGP route is sent to the selected BGP route storing and processing module. For example, the neighbor route receiving and distributing module sends the BGP route from the BGP neighbor to the determined BGP route storing and processing module.

The BGP route storing and processing module that receives the BGP route may process the received BGP route.

It can be known from Embodiment 4 that, through setting at least two BGP route storing and processing modules according to the route prefix, and selecting, according to the route prefix, one BGP route storing and processing module for the BGP route from the BGP neighbor, each BGP route storing and processing module may not need to process all the BGP routes, thereby reducing the burden of BGP route processing of the BGP route storing and processing module, and avoiding the bottleneck problem of the BGP processing performance. Therefore, the BGP route storing and processing module can process more BGP routes, and thereby finally improving the extensibility of the network.

Embodiment 5

Figure 7:
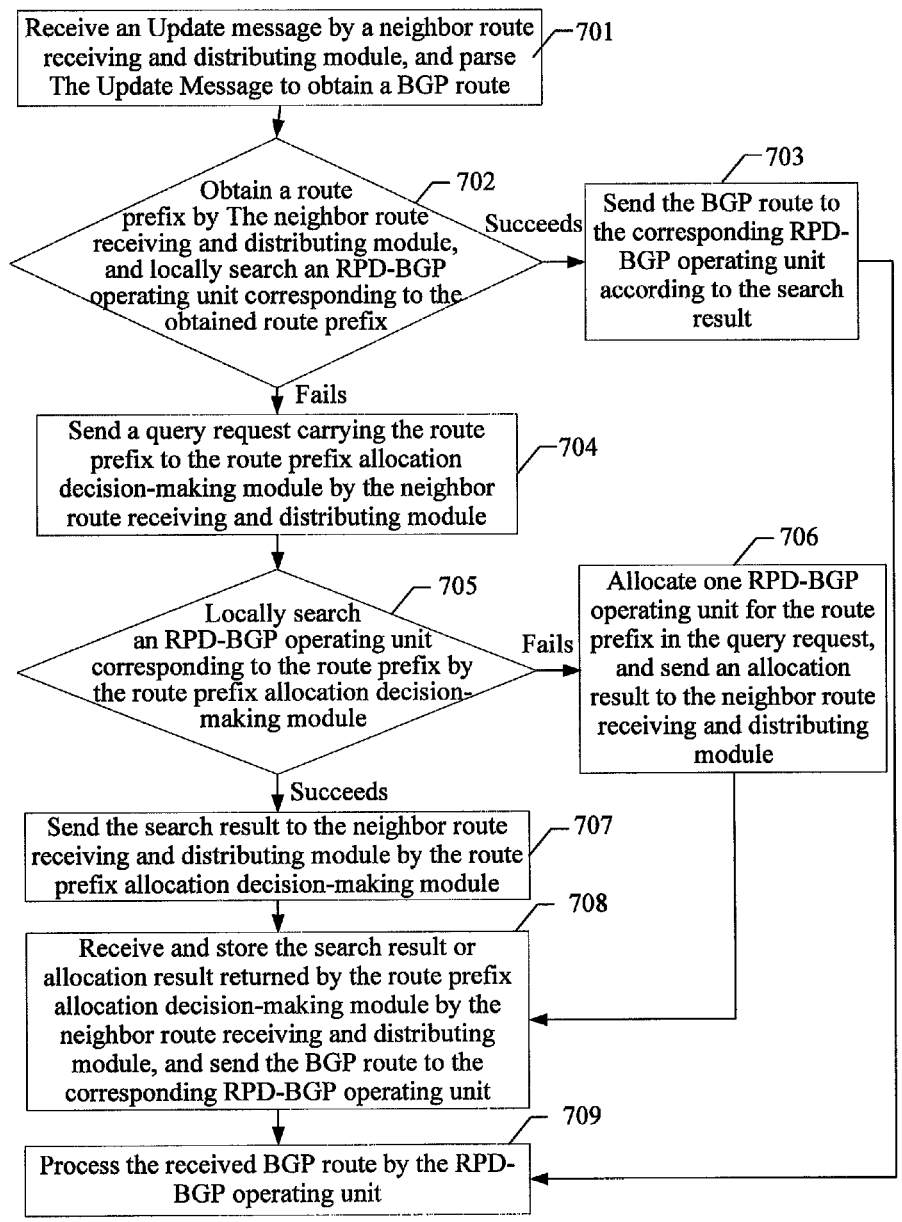
FIG. 7 is a flow chart of a method for processing a BGP route according to a fifth embodiment of the present invention.

A method for processing BGP route is provided, and a flow chart of the method is as shown in FIG. 7.

In FIG. 7, in step 701, a neighbor route receiving and distributing module receives an Update message, and parses from the Update message a BGP route from the BGP neighbor, and in a VPN environment, the BGP route may be a VPN route. Furthermore, if a private network route from a CE neighbor is parsed from the Update message, the private network route needs to be converted into a VPN route.

In step 702, the neighbor route receiving and distributing module obtains the route prefix from information contained in the BGP route, and searches for an RPD-BGP operating unit corresponding to the obtained route prefix in the locally stored corresponding relation of the route prefixes and the BGP route storing and processing modules, and if the searching succeeds, step 703 is performed; if the searching fails, step 704 is performed.

The locally stored corresponding relation may be referred to as a corresponding relation of the route prefixes and the RPD-BGP operating units. In a VPN environment, the route prefix may be an RD in a route prefix of the VPN route.

In step 703, the neighbor route receiving and distributing module sends the BGP route to the corresponding BGP route storing and processing module according to the search result, that is, sends the BGP route to the corresponding RPD-BGP operating unit, and step 709 is performed.

In step 704, the neighbor route receiving and distributing module sends a query request carrying the route prefix to the route prefix allocation decision-making module according to the obtained route prefix, so as to obtain the RPD-BGP operating unit corresponding to the route prefix.

In step 705, after receiving the query request, the route prefix allocation decision-making module searches the corresponding relation of the locally stored route prefixes and the RPD-BGP operating units for an RPD-BGP operating unit corresponding to the route prefix in the query request, and if the searching fails, step 706 is performed; if the searching succeeds, step 707 is performed.

In step 706, the route prefix allocation decision-making module allocates one RPD-BGP operating unit for the route prefix in the query request according to the route prefix allocation strategy, sends an allocation result to the neighbor route receiving and distributing module, and step 708 is performed.

In step 707, the route prefix allocation decision-making module sends the search result to the neighbor route receiving and distributing module, that is, the route prefix allocation decision-making module returns the found RPD-BGP operating unit corresponding to the route prefix to the neighbor route receiving and distributing module, and step 708 is performed.

In step 708, the neighbor route receiving and distributing module receives and stores the search result or allocation result returned by the route prefix allocation decision-making module, and sends the BGP route to the corresponding RPD-BGP operating unit.

In step 709, the RPD-BGP operating unit processes the received BGP route.

It can be known from Embodiment 5 that, one RPD-BGP operating unit is selected for the BGP route from the BGP neighbor according to the route prefix, so that the BGP routes from the BGP neighbors are distributed to multiple RPD-BGP operating units for processing, thereby reducing the burden of an RPD-BGP operating unit for processing BGP routes from a BGP neighbor, and avoiding the bottleneck problem that a single RPD-BGP operating unit needs to process all BGP routes from a BGP neighbor and that the BGP processing performance is affected. Therefore, the BGP operating unit can process more BGP routes from a BGP neighbor, and thereby finally improving the extensibility of the network.

Through the above descriptions of the embodiments, it is apparent to those skilled in the art that, the present invention may be accomplished by software together with a necessary universal hardware platform, and definitely may also be completely accomplished by hardware. In most cases, the former is a preferred implementation manner. Therefore, all or a part of the above technical solutions of the present invention that makes contributions to the prior art can be substantially embodied in the form of a software product. The computer software product may be stored in a computer readable storage medium such as a ROM/RAM, a magnetic disk, or an optical disk, and contain several instructions to instruct a computer equipment (for example, a personal computer, a server, or network equipment) to perform the methods described in the embodiments of the present invention or in some parts of the embodiments of the present invention.

The above descriptions are merely some exemplary embodiments of the present invention, but not intended to limit the present invention. Any modification, equivalent replacement, and improvement made without departing from the spirit and principle of the present invention shall fall within the protection scope of the present invention.

What is claimed is:

1. A method for distributed processing of Border Gateway Protocol (BGP) routes, comprising:
   receiving, by a route receiving module in a BGP router, a BGP route sent by a BGP neighbor;
   obtaining a route prefix of the BGP route;
   selecting, in accordance with the route prefix, one of a plurality of BGP route processing modules for processing the BGP route, wherein the BGP route processing modules are distributed across different boards in the BGP router, and wherein the BGP route processing modules located on different boards are assigned to process different route prefixes; and
   sending the BGP route to the selected BGP route processing module to prompt processing of the BGP route by the selected BGP processing module,
   wherein selecting one of the plurality of BGP route processing modules comprises sending a query request carrying the route prefix to a route prefix allocation decision-making module, and receiving a query result returned by the route prefix allocation decision-making module, wherein the query result specifies the BGP route processing module to be associated with the route prefix.

2. The method according to claim 1, wherein the route prefix allocation decision-making module assigns the route prefix to the BGP route processing module in accordance with a locally statically configured corresponding relation of route prefixes and BGP processing modules.

3. The method according to claim 1, wherein in a virtual private network (VPN) environment, the BGP route is a VPN route, and the route prefix is a route distinguisher (RD) in a route prefix of the VPN route, and
wherein the method further comprises receiving a private network route from a customer edge (CE) neighbor, and converting the private network route into a VPN route.

4. The method according to claim 1, wherein the route prefix allocation decision-making module assigns the route prefix to the BGP route processing module in accordance with a locally stored route prefix allocation strategy, the route prefix allocation strategy comprising a sequential allocation in turn, a load balancing allocation, or a random allocation.

5. The method according to claim 1, wherein the route receiving module is separate and distinct from the BGP processing modules.

6. The method according to claim 1, wherein the route receiving module is located on a board that excludes BGP processing modules.

7. The method according to claim 1, wherein different BGP processing modules are assigned to process BGP routes received from different BGP neighbors.

8. The method according to claim 7, wherein distributed memory resources are co-located with each of the plurality of BGP processing modules on each of the different boards in the BGP router.

9. The method according to claim 8, wherein the distributed memory resources store BGP route information for BGP neighbors assigned to the co-located BGP processing module while excluding BGP route information for BGP neighbors that are not assigned to the co-located BGP processing module.

10. The method according to claim 1, wherein a centralized BGP route processing module is excluded from the BGP router.

11. A method for distributed processing of Border Gateway Protocol (BGP) routes, comprising:
receiving, by a route receiving module in a BGP router, a BGP route sent by a BGP neighbor;
obtaining a route prefix of the BGP route;
selecting, in accordance with the route prefix, one of a plurality of BGP route processing modules for processing the BGP route, wherein the BGP route processing modules are distributed across different boards in the BGP router, wherein the BGP route processing modules located on different boards are assigned to process different route prefixes, wherein selecting one of the plurality of BGP route processing modules comprises identifying a BGP processing module associated with the route prefix in a table stored in the BGP router; and
sending the BGP route to the selected BGP route processing module to prompt processing of the BGP route by the selected BGP processing module.

12. A Border Gateway Protocol (BGP) router comprising:
a plurality of BGP route processing modules distributed across different boards in the BGP router, wherein the BGP route processing modules located on different boards are assigned to process different route prefixes;
a BGP receiving module comprising a processor, the BGP receiving module configured to receive a BGP route from a BGP neighbor, to obtain a route prefix of the BGP route, to select one of the plurality of BGP route processing modules for processing the BGP route, and to send the BGP route to the selected BGP route processing module for processing; and
a route prefix allocation module configured to assign route prefixes to the BGP route processing modules,
wherein the BGP receiving module is further configured to send a query request carrying the route prefix to the route prefix allocation module, receive a query result from the route prefix allocation module, and select the BGP route processing module in accordance with the query result.

13. The BGP router according to claim 12, wherein the route receiving module is separate and distinct from the BGP processing modules.

14. The BGP router according to claim 12, wherein the route receiving module is located on a board that excludes BGP processing modules.

15. The BGP router according to claim 12, wherein different BGP processing modules are assigned to process BGP routes from different BGP neighbors.

16. The BGP router according to claim 15, further comprising: distributed memory resources being co-located with each of the plurality of BGP processing modules on each of the different boards in the BGP router.

17. The BGP router according to claim 16, wherein the distributed memory resources are configured to store BGP route information for BGP neighbors assigned to the co-located BGP processing module while excluding BGP route information for BGP neighbors that are not assigned to the co-located BGP processing module.

18. The BGP router according to claim 12, wherein a centralized BGP route processing module is excluded from the BGP router.

19. The method according to claim 11, wherein in a virtual private network (VPN) environment, the BGP route is a VPN route, and the route prefix is a route distinguisher (RD) in a route prefix of the VPN route, and
wherein the method further comprises receiving a private network route from a customer edge (CE) neighbor, and converting the private network route into a VPN route.

20. The method according to claim 11, wherein a route prefix allocation decision-making module assigns the route prefix to the BGP route processing module in accordance with a locally stored route prefix allocation strategy, the route prefix allocation strategy comprising a sequential allocation in turn, a load balancing allocation, or a random allocation.

21. The method according to claim 11, wherein different BGP processing modules are assigned to process BGP routes received from different BGP neighbors.

22. The method according to claim 21, wherein distributed memory resources are co-located with each of the plurality of BGP processing modules on each of the different boards in the BGP router.

23. The method according to claim 22, wherein the distributed memory resources store BGP route information for BGP neighbors assigned to the co-located BGP processing module while excluding BGP route information for BGP neighbors that are not assigned to the co-located BGP processing module.

* * * * *